(12) United States Patent
Jamalpuri et al.

(10) Patent No.: US 8,086,969 B2
(45) Date of Patent: Dec. 27, 2011

(54) SYSTEM AND METHOD FOR GRAPHICAL USER INTERFACE

(75) Inventors: Kishore Jamalpuri, Hyderabad (IN); Sivashankar Munthi, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 365 days.

(21) Appl. No.: 12/361,627

(22) Filed: Jan. 29, 2009

(65) Prior Publication Data

US 2010/0192073 A1 Jul. 29, 2010

(51) Int. Cl.
*G06F 3/00* (2006.01)
*G06F 3/048* (2006.01)

(52) U.S. Cl. ......... 715/810; 715/762; 715/825; 715/861

(58) Field of Classification Search .................. 715/700, 715/762, 765, 810, 825, 826, 859, 860, 861
See application file for complete search history.

(56) References Cited

U.S. PATENT DOCUMENTS

| | | | | |
|---|---|---|---|---|
| 5,818,444 A | * | 10/1998 | Alimpich et al. | 715/765 |
| 7,562,308 B2 | * | 7/2009 | Pradhan et al. | 715/810 |
| 2004/0212634 A1 | * | 10/2004 | Hayhow | 345/700 |
| 2006/0112333 A1 | * | 5/2006 | Iwanaga | 715/531 |
| 2007/0061786 A1 | * | 3/2007 | Zhou et al. | 717/136 |

* cited by examiner

*Primary Examiner* — Tuyetlien Tran
*Assistant Examiner* — Truc Chuong

(57) ABSTRACT

The present invention provides a system and method (60) for providing a graphical user interface. The proposed method (60) for graphical user interface includes generating an application window (10) containing a plurality of controls (12-34). A first user input (64-72) is received for selecting an area (36) within the application window (10). A group of controls (18-34) are then identified, among the plurality of controls (12-34), which are included within the selected area (36). A second user input (76) is received to enter a value in one of the controls (18) in the identified group of controls (18-34). The same value is then updated in the remaining controls (20-34) in the identified group of controls.

10 Claims, 3 Drawing Sheets

SYSTEM AND METHOD FOR GRAPHICAL USER INTERFACE

FIELD OF INVENTION

The present invention relates graphical user interfaces.

BACKGROUND OF INVENTION

In an application having multiple controls, such as combo controls, at any point of time, it is only possible to change value in one of the controls. Even though programmatically it is possible to change values in multiple controls, the user does not have a choice to dynamically select a group of controls and change the values (preferably same) in them simultaneously. In a situation where there are more than one combo controls and all are having same set of entries, and if user wants to select same value in all the combo controls, it has to be done individually. There is no way this can be done at one-shot for the desired combo controls. The user has to select explicitly every combo control to set the same value in all the combo controls.

Hence, there is a need for an improved graphical user interface for such applications that address the above-mentioned problems.

SUMMARY OF INVENTION

To address the above problems, the present invention provides a solution to dynamically choose different controls and select the same value in them in a single step. In accordance with one aspect of the present invention, a method for graphical user interface is proposed that begins by generating an application window containing a plurality of controls. The method includes receiving a first user input for selecting an area within said application window and identifying a group of controls, among said plurality of controls, that are included within the selected area. The method then includes receiving a second user input to enter a value in one control in said identified group of controls and updating said value in the remaining controls in said identified group of controls.

According to another aspect of the present invention, a system for providing a graphical user interface comprises means for generating an application window containing a plurality of controls. Means are provided for receiving a first user input for selecting an area within said application window and for identifying a group of controls, among said plurality of controls, that are included within the selected area. The system further includes means for receiving a second user input to enter a value in one control in said identified group of controls and means for updating said value in the remaining controls in said identified group of controls.

BRIEF DESCRIPTION OF THE DRAWINGS

The present invention is further described hereinafter with reference to exemplary embodiments shown in the accompanying drawings, in which.

DETAILED DESCRIPTION OF INVENTION

Figure 1:
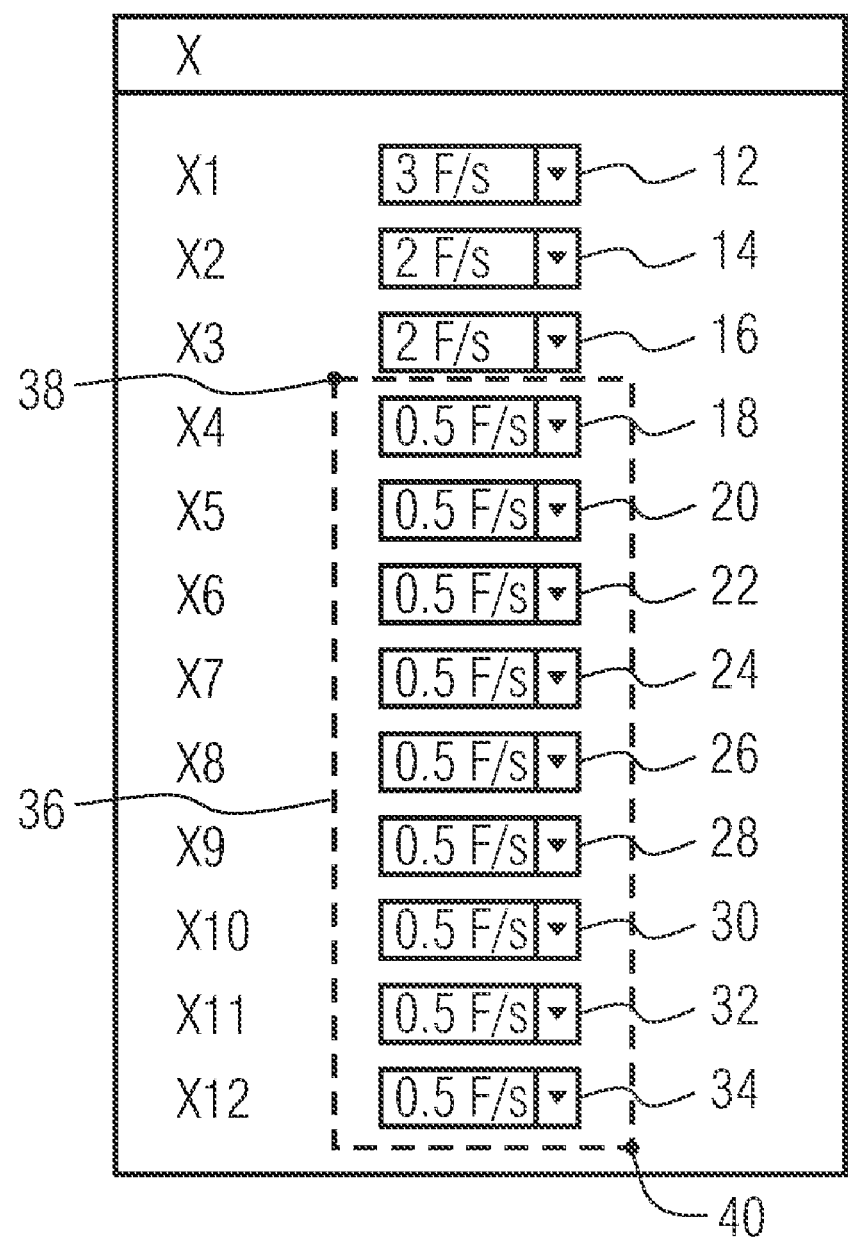
FIG. 1 is a schematic diagram illustrating an application window wherein an area is selected containing a group of controls whose values are updated simultaneously.

FIG. 1 shows an application window 10 containing a number of controls, that are shown to be combo controls. In this example, there are twelve such combo controls, indicated by reference numerals 12 to 34. It should be noted that although the controls 12 to 34 are shown to be combo controls in the present example, the proposed concept can be extended to other kinds of controls, such as list-boxes, edit boxes, among others. In the illustrated example, each of the combo controls 12 to 34 is meant to enter a value associated with a respective parameter (X1 to X12).

In accordance with the present invention, if a situation arises that the same value needs to be entered for parameters X4 to X12, the user of the application selects an area 36 in the application window 10, via user input means such as a mouse, such that the area 36 contains the relevant group of controls whose value needs to be changed/updated. In this case the area 36 is selected such that the combo controls 18 to 34 are enclosed in it. In the illustrated example, the user does a left mouse button click at a start point 38 having a first set of coordinates (sx,sy) and drags the mouse pointer to an end point 40 having a second set of coordinates (ex,ey) and releases the left mouse button. A rectangular area 36 is identified which has points 38 and 40 as diagonal corner points. All controls that are included within the rectangular area 36 (i.e., the group of controls 18 to 34) are then identified and highlighted. Next, another user input is received wherein the user selects any of the combo controls (for example, the combo control 18) in said group of controls and enters/updates the value in that control. This action will result in the same value (in this case, 0.5 F/s) being entered/updated in all the remaining controls 20 to 34 of the group. In this way, the user is able to perform value entries/updation in multiple combo controls in a single step. Further, the user can de-select the selected area 36 and deactivate the above feature by another simple user input, for example, by pressing the 'Esc' key in the keyboard.

Figure 2:
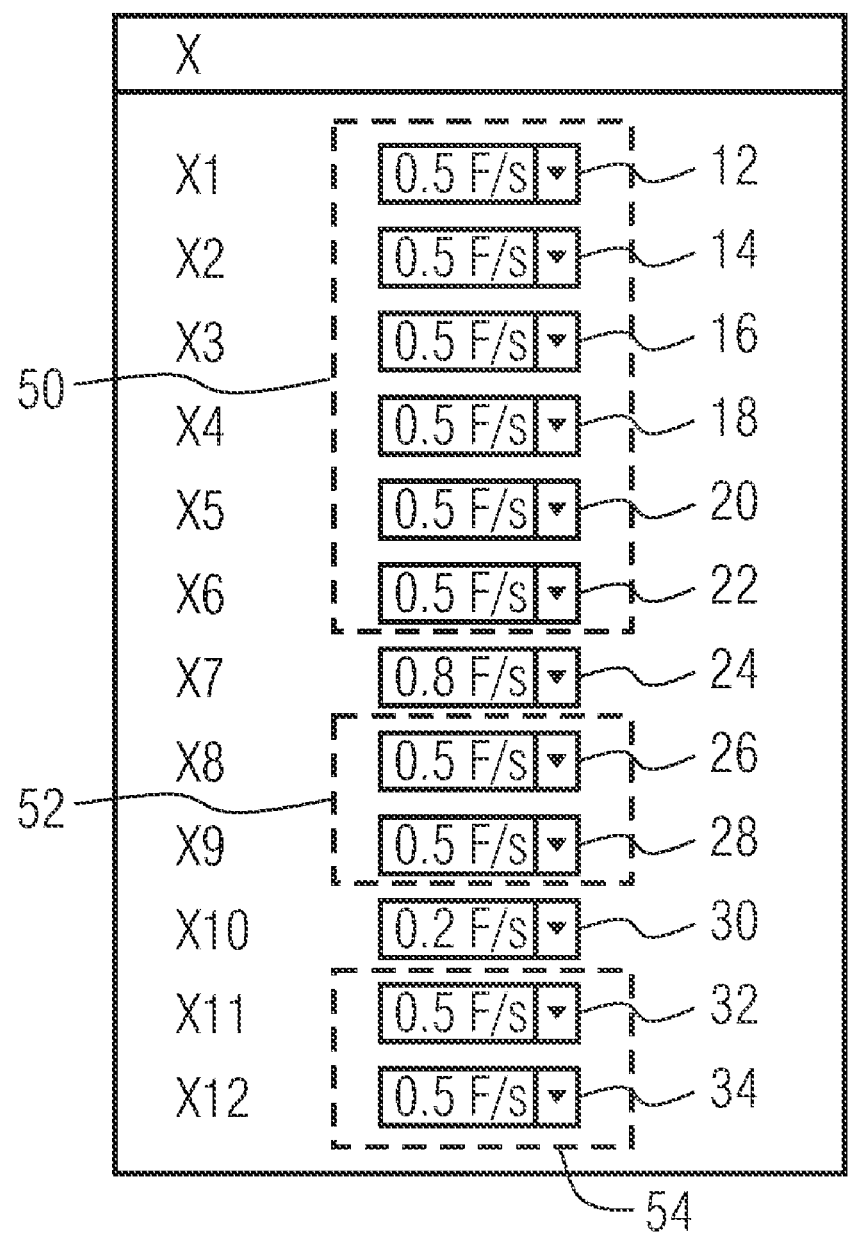
FIG. 2 is a schematic diagram illustrating an application window wherein multiple isolated areas are selected containing multiple groups of controls whose values are updated simultaneously.

In a further embodiment of the present invention, the user can select more than one group of controls for updating/entering value, these multiple groups of controls being located in different regions in the application window. In the example illustrated in FIG. 2, the user selects three isolated areas, represented by rectangle areas 50, 52 and 54, containing three groups of controls 12-22, 26-28 and 32-34 respectively. The user can then select any one control from among these three groups of controls and update/enter a value in that control. The same value is then entered/updated in the remaining controls in the three groups. Business logic may be provided to ensure that a group should contain more than one control.

Figure 3:
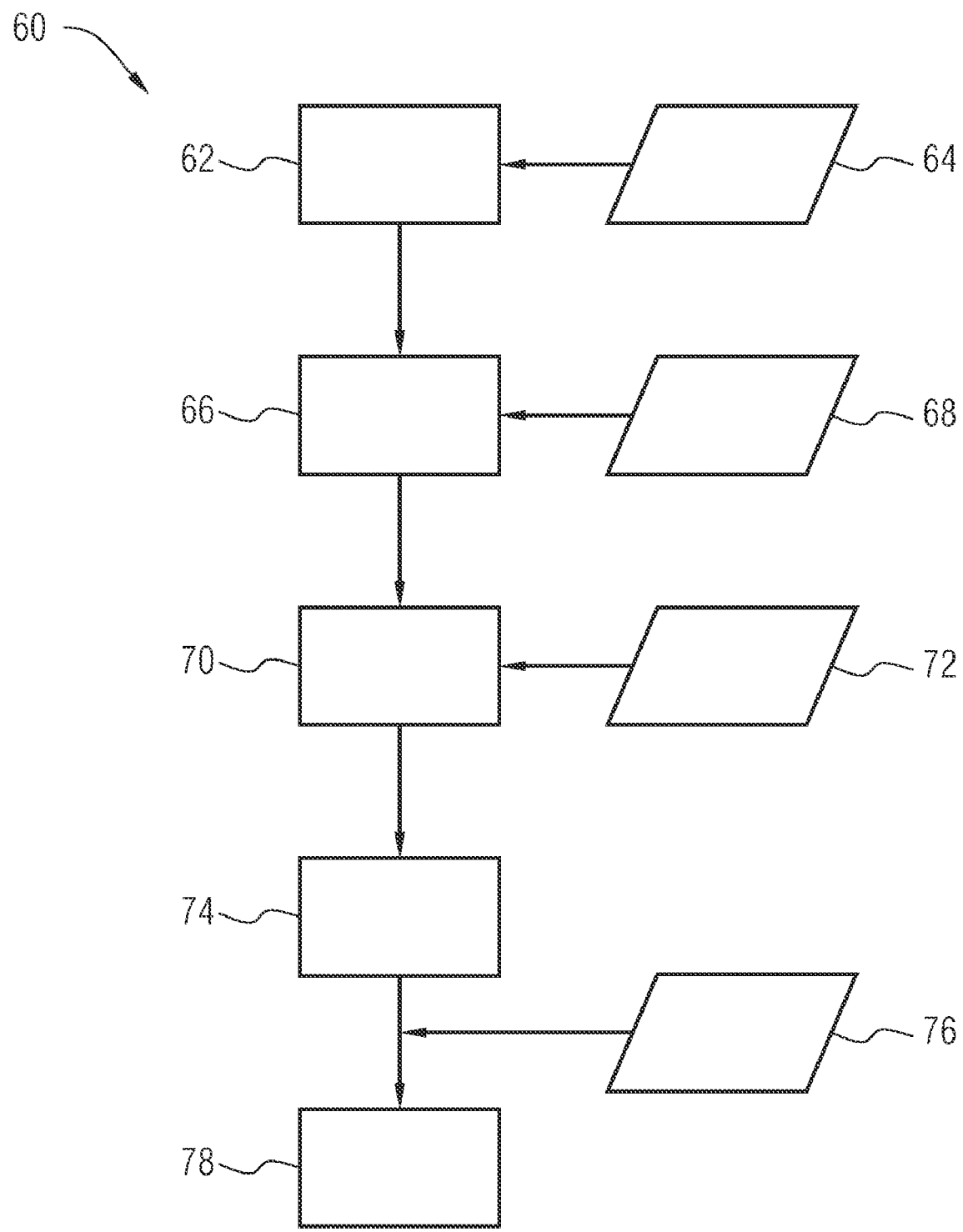
FIG. 3 is a flowchart illustrating a method for providing a graphical user interface in accordance with an embodiment of the present invention.

FIG. 3 is a flowchart illustrating a method 60 for providing a graphical user interface (GUI) of the above-mentioned type in accordance with one embodiment of the present invention. The method 60 begins at block 62 when a user input (represented by input block 64) is received comprising, for example, a left mouse button click at a starting point in the application window. The business logic determines the coordinates of the starting point and initiates drawing of the rectangular area. The method 60 proceeds by expanding the rectangular area (block 66) as the user continues to drag the mouse pointer over the application window (represented by input block 68). Block 70 indicates the end of the drawing of the rectangular area once the user releases the left mouse button (represented by input block 72). At this point, the business logic determines the end point (point of mouse button release) and identifies a rectangular area having said start point and end point as diagonal corners. Next, at block 74, the business logic identifies a group of controls that are located within this rectangular area. At input block 76, the user selects one of the controls, among the identified group of controls, and enters a value in that control. Subsequently, at block 78, the same value is entered/updated in all the remaining controls in the group.

The present invention thus provides a user friendly GUI, wherein the user has the choice to dynamically select a group of combo controls and change the values (preferably same) in them simultaneously. As mentioned above, this solution can also be extended to other controls like edit-boxes, list-boxes, among others.

Summarizing, the present invention provides a system and method for providing a graphical user interface. The proposed method for graphical user interface includes generating an application window containing a plurality of controls. A first user input is received for selecting an area within said application window. A group of controls are then identified, among said plurality of controls, which are included within the selected area. A second user input is received to enter a value in one of the controls in said identified group of controls. The same value is then updated in the remaining controls in said identified group of controls.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. Accordingly, it is intended that the invention be limited only by the spirit and scope of the appended claims.

The invention claimed is:

1. A method for providing a graphical user interface, comprising:
    generating an application window containing a plurality of controls, wherein each of the controls has a user selectable value associated therewith;
    receiving a first user input for selecting a rectangular area within said application window by graphically drawing a rectangle that encloses a group of controls in the application window via a pointing device;
    identifying the group of controls, among said plurality of controls, that are included within the selected rectangular area;
    receiving a second user input to enter a value in one control in said identified group of controls; and
    automatically updating the remaining controls in said identified group of controls with the same value as entered in the one control,
    wherein selecting said rectangular area further comprises:
        receiving from the pointing device a starting coordinate comprising a mouse-click by the user at a first point in said window;
        receiving from the pointing device an end coordinate comprising a mouse-release by the user at a second point in said window; and
        identifying the rectangular area having diagonal corners defined by said starting coordinate and said end coordinate, and
        wherein selecting the rectangular area comprises selecting via the pointing device multiple isolated rectangular areas in said window, and wherein identifying a group of controls comprises identifying multiple groups of controls that are respectively included within said multiple isolated rectangular areas.

2. The method according to claim 1, wherein said plurality of controls comprise combo controls.

3. The method according to claim 1, wherein said plurality of controls comprise edit-boxes.

4. The method according to claim 1, wherein said plurality of controls comprise list-boxes.

5. The method according to claim 1, further comprising receiving a third user input to deselect said selected rectangular area.

6. A system for providing a graphical user interface that automatically updates a plurality of selected controls, comprising:
    means for generating an application window containing a plurality of controls, wherein each of the controls has a user selectable value associated therewith;
    a pointing device, comprising a mouse, for graphically interfacing with the application window;
    means for receiving a first user input for selecting rectangular area within said application window by graphically drawing a rectangle that encloses a group of controls in the application window via the pointing device;
    means for identifying the group of controls, among said plurality of controls, that are included within the selected rectangular area;
    means for receiving a second user input to enter a value in one control in said identified group of controls; and
    means for automatically updating the remaining controls in said identified group of controls with the same value as entered in the one control,
    wherein selecting said rectangular area further comprises:
        means for receiving from the pointing device a starting coordinate comprising a mouse-click by the user at a first point in said window;
        means for receiving from the pointing device an end coordinate comprising a mouse-release by the user at a second point in said window; and
        means for identifying the rectangular area having diagonal corners defined by said starting coordinate and said end coordinate, and
            wherein means for selecting the rectangular area comprises means for selecting via the pointing device multiple isolated rectangular areas in said window, and wherein identifying a group of controls comprises identifying multiple groups of controls that are respectively included within said multiple isolated rectangular areas.

7. The system according to claim 6, wherein said plurality of controls comprise combo controls.

8. The system according to claim 6, wherein said plurality of controls comprise edit-boxes.

9. The system according to claim 6, wherein said plurality of controls comprise list-boxes.

10. The system according to claim 6, further comprising means for receiving a third user input to deselect said selected rectangular area.

* * * * *